United States Patent [19]
Stacy

[11] Patent Number: 4,960,160
[45] Date of Patent: Oct. 2, 1990

[54] VEHICULAR TRACTION STRAP ARRANGEMENT

[76] Inventor: Michael J. Stacy, P.O. Box 424, Norfolk, N.Y. 13667

[21] Appl. No.: 339,300

[22] Filed: Apr. 17, 1989

[51] Int. Cl.[5] .............................................. B60C 27/02
[52] U.S. Cl. .................................... 152/216; 152/221; 152/233; 24/68 CT; 24/573.1
[58] Field of Search ............... 152/178, 179, 190, 191, 152/208, 213, 216, 217, 218, 219, 221, 222, 223, 224, 225 R, 225 C, 226, 227, 228, 229, 233, 241, 243, 239; 24/68 CD, 68 CT, 573, 574; 301/41 R, 44 R

[56] References Cited

U.S. PATENT DOCUMENTS

| | | | |
|---|---|---|---|
| 2,422,595 | 6/1947 | Stevens | 152/221 |
| 2,970,632 | 2/1961 | Kuc | 152/233 |
| 4,037,513 | 7/1977 | Hobsen | 24/573 |
| 4,055,210 | 10/1977 | Mongault | 152/221 |
| 4,155,388 | 5/1979 | Rajcic et al. | 152/221 |
| 4,155,389 | 5/1979 | Dwinnell | 152/221 |
| 4,287,925 | 9/1981 | Spann | 152/221 |
| 4,456,047 | 6/1984 | Ishida | 152/213 A |

FOREIGN PATENT DOCUMENTS 501553 6/1930 Fed. Rep. of Germany ... 152/225 R

Primary Examiner—Robert A. Dawson
Assistant Examiner—Gregory J. Wilber
Attorney, Agent, or Firm—Leon Gilden

[57] ABSTRACT

A traction device for use in combination with vehicular tires includes a series of traction straps arranged at forty-five degree intervals about the tire and extending over the traction surface of the tire with forward and rear securement bands extending radially of the tire and coextensively of the traction bands to cooperate with respective forward and rear securement rings. A series of forward and rear side wall bands maintain the orientation of the traction and anchor bands. The forward anchor bands extending through the forward anchor ring are provided with apertures to receive a lock pin therethrough wherein the bands are each formed of resilient material to enable the arrangement to accommodate variation in tire sizes, as well as providing for enhanced traction in association with the tire.

2 Claims, 4 Drawing Sheets

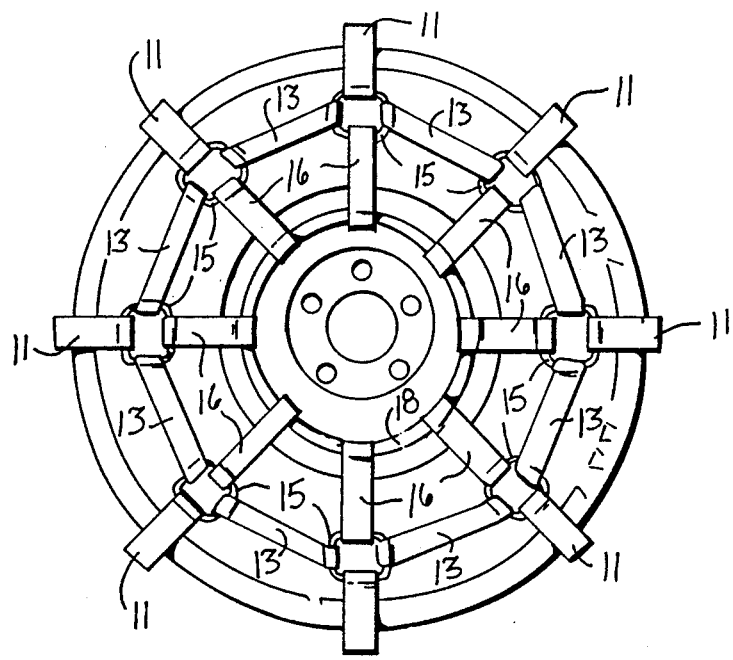

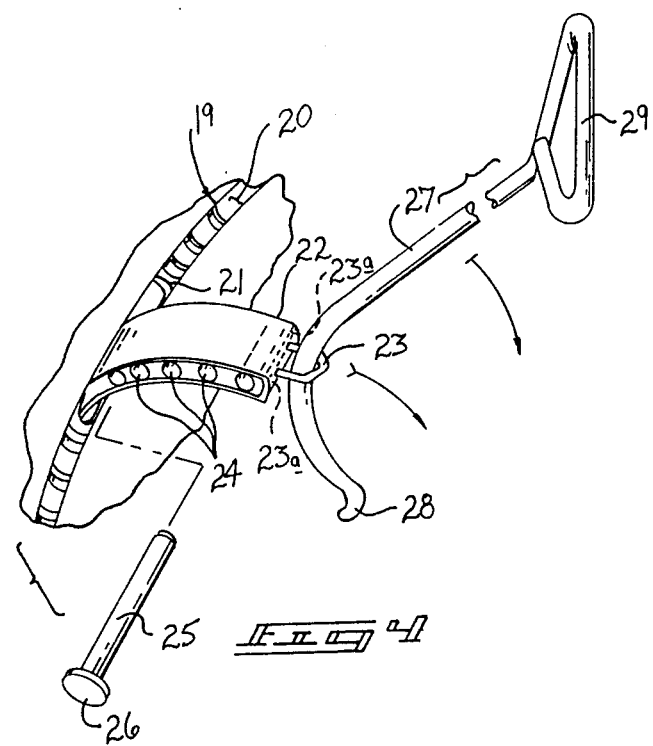

VEHICULAR TRACTION STRAP ARRANGEMENT

BACKGROUND OF THE INVENTION

1. Field of the Invention

The field of invention relates to traction devices, and more particularly pertains to a new and improved vehicular traction strap arrangement wherein the same may be adjustably mounted to a range of tire sizes.

2. Description of the Prior Art

The use of tractions devices in combination with tires is well known in the prior art. Heretofore the devices of the prior art have included various arrangements to secure the bands about an associated tire. The prior art has, however, failed to set forth the combination, as provided by the instant invention, of orienting traction bands at forty-five degree intervals about the exterior surface of a tire for efficiency of operation in association with minimizing necessary structure to effect traction. The prior art has heretofore failed to provide the readily adjustable mechanism as set forth by the instant invention to accommodate various tire diameters. Examples of the prior art may be found in U.S. Pat. No. 4,055,210 to Mongault setting forth a series of traction straps for positioning about the exterior surface of a tire with positioning nipples secured to cable hooks formed on each end of the traction straps utilized by the invention.

U.S. Pat. No. 4,155,388 to Rajcic sets forth a traction band arrangement utilizing various traction devices, such as chains, rubber straps, and the like, wherein the ends of the straps are securable within a serrated toothed anchor band.

U.S. Pat. No. 4,155,389 to Dwinell sets forth a cable chain traction band arrangement wherein each end of the cable chain is provided with a hook for securement through a loop formed of a central sleeve positioned within the internal diameter of the tire.

U.S. Pat. No. 4,287,925 to Spann sets forth a traction device utilizing a series of non-skid bands, each end secured to a single side wall band formed adjacent the side wall of the tire on the forward and rear surfaces of the tire.

U.S. Pat. No. 4,456,047 to Ishida sets forth a further example of a traction device utilizing a series of traction bands utilizing a chain side wall band to secure the ends of the traction band adjacent the side wall of the tire with diametrically formed and positioned strips to maintain the side wall band in desired orientation relative to the tire.

As such, it may be appreciated that there is a continuing need for a new and improved vehicular traction strap arrangement wherein the same addresses both the problems of ease of use and tire size accommodation, and in this respect, the present invention substantially fulfills this need.

SUMMARY OF THE INVENTION

In view of the foregoing disadvantages inherent in the known types of traction devices now present in the prior art, the present invention provides a vehicular traction strap arrangement wherein the same employs traction bands arranged at forty-five degree intervals about the exterior traction surface of the tire with associated forward and rear securement rings in turn maintained relative to the tire by forward and rear anchor rings to maintain the positional integrity of the arrangement relative to an associated tire. As such, the general purpose of the present invention, which will be described subsequently in greater detail, is to provide a new and improved vehicular traction strap arrangement which has all the advantages of the prior art traction devices and none of the disadvantages.

To attain this, the present invention comprises a series of traction bands extending transversely of the traction surface of an associated tire and extending downwardly along either side of the side wall of the tire medially of the side wall with coextensively aligned forward and rear anchor bands, wherein the rear anchor bands are integrally secured to a rigid anchor ring with the forward anchor bands extending through associated slots within a forward anchor ring wherein the free ends of the forward anchor bands are provided with throughextending sleeves for accommodation of a cylindrical lock pin therethrough. The lock pin is provided with an enlarged arcuate head of a complementary configuration to an interior arcuate face of the associated anchor ring. The arrangement further includes forward and rear securement rings extending along the side wall of the tire to maintain the traction and anchor bands in a predetermined arrangement about the tire.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular traction strap arrangement which has all the advantages of the prior art traction devices and none of the disadvantages.

It is another object of the present invention to provide a new and improved vehicular traction strap arrangement which may be easily and efficiently manufactured and marketed.

It is a further object of the present invention to provide a new and improved vehicular traction strap arrangement which is of a durable and reliable construction.

An even further object of the present invention is to provide a new and improved vehicular traction strap arrangement which is susceptible of a low cost of manufacture with regard to both materials and labor, and which accordingly is then susceptible of low prices of sale to the consuming public, thereby making such vehicular traction strap arrangements economically available to the buying public.

Still yet another object of the present invention is to provide a new and improved vehicular traction strap arrangement which provides in the apparatuses and methods of the prior art some of the advantages thereof, while simultaneously overcoming some of the disadvantages normally associated therewith.

Still another object of the present invention is to provide a new and improved vehicular traction strap arrangement wherein the same accommodates variations in tire sizes, as well as enabling enhanced traction of an associated tire.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view taken in elevation of the instant invention.

FIG. 4 is an isommetric detailed view of the anchor band securement arrangement of the instant invention.

DESCRIPTION OF THE PREFERRED EMBODIMENT

Figure 1:
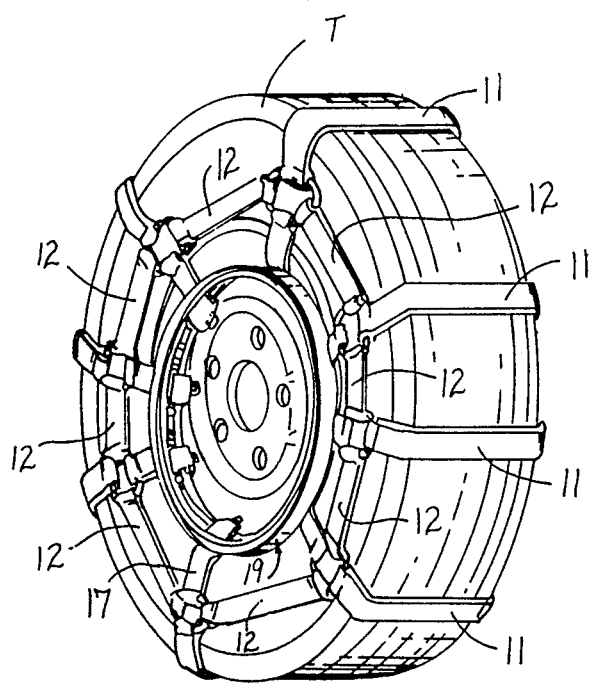
FIG. 1 is a an isometric view of the instant invention.
Figure 2:
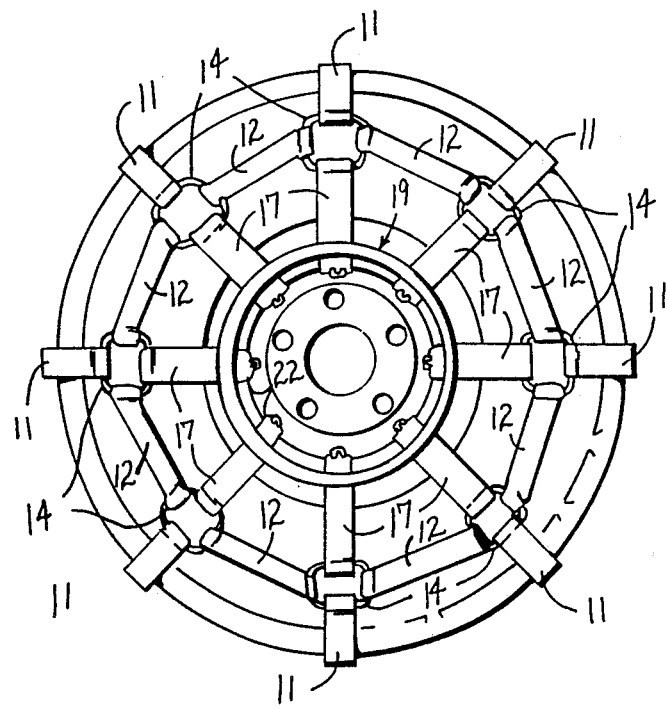
FIG. 2 is an orthographic frontal view taken in elevation of the instant invention.

With reference now to the drawings, and in particular to FIGS. 1 to 4 thereof, a new and improved vehicular traction strap arrangement embodying the principles and concepts of the present invention and will be described.

A series of eight traction bands 11 arranged at forty-five degree angles relative to one another extending orthogonally about an exterior traction surface of an associated vehicular tire "T". The arrangement 10 further includes a series of forward side wall bands 12 and a companion series of rear side wall bands 13 extending in a circular array about the respective forward and rear sides of the associated tire "T". Each of the traction bands and the forward and rear side wall bands are formed with a cylindrical loop at each end, wherein each loop is formed about a respective forward and rear securement ring 14 and 15. The respective forward and rear securement rings 14 and 15 are of generally rectangular configuration wherein three sides of the respective configuration includes an end of the traction band 11 with the sides of the respective securement ring securing a respective loop end of a respective forward and rear side wall band 13. The remaining lowermost side of each securement ring receives a respective rear and forward anchor band 16 and 17 which is also provided with a similar loop arrangement capturing the associated securement ring. The rear anchor bands 16 and the forward anchor bands 17 are each aligned and radially coextensive of the associated tire "T"with the rear anchor band 16 formed with loops at their lowermost ends attached to a rigid rear anchor ring 18 that is of a diameter less than that of the associated tire "T". The forward anchor bands 17 extend radially towards the axial center of the associated vehicular "tire"and are directed through a respective slot 21 within the forward anchor ring 19. The slots 21 are directed through a side wall of the forward anchor ring 19 wherein the anchor ring 19 is provided with a concave arcuate interior face 20, as illustrated in FIG. 4 for example. The free end 22 of each anchor band 17 is directed through an associated slot 21 wherein each anchor band is formed with a series of cylindrical sleeves 24 arranged orthogonally of the associated anchor band 17. The remote end of the anchor band, set forth as the free end 22, is provided with a rigid adjustment loop 23 extending outwardly of the free end wherein the adjustment loop 23 is formed with legs 23a extending interiorly of the free end to fixedly secure each rigid loop to each of the bands 17. It should be noted that each of the traction bands 11, side wall bands 12 and 13, rear and forward anchor bands 16 and 17 are each formed of a resilient polymeric material of memory retentent configurational quality to enable each of the bands to spring back to a relaxed configuration. The adjustment loops 23 enable each of the free ends 22 of the anchor bands 17 to be stretched and drawn through the associated slots 21 by use of a lever tool 27. The lever tool 27 includes a generally "S"shaped tip for engagement with the rim of the associated tire to enable the free end 22 to be drawn through that associated slot, and wherein the lever tool 27 is provided with a convenient looped handle to enable enhanced manual grasping of the tool. The free ends 22 are thereby drawn through their associated slots 21 and accordingly enable a cylindrical lock pin 25 to be directed through one of the cylindrical sleeves 24 most adjacent the arcuate interior face 20 of the forward anchor ring 19. The cylindrical lock pin 25 is formed with an enlarged arcuate head 26, wherein the arcuate head 26 is of an exterior configuration complementary in shape to that of the interior face 20 of the forward anchor ring 19 to thereby seat and lock the lock pin 25 relative to the interior face 20 wherein spring back of each terminal free end 22 of the associated anchor bands 17 resiliently engages each arcuate head 26 against the interior face 20, as set forth above.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular traction apparatus in combination with a vehicular tire including a central wheel opening defined by a predetermined diameter, wherein said vehicular tire includes a forward side wall and a rear side wall, and said apparatus comprises, a first series of individual traction bands extending orthogonally across the road contacting surface of the tire, each traction band including a forward terminal end extending to the forward side wall and a rear terminal end extending to the rear side wall, and a second series of individual forward side wall bands arranged annularly about the forward side wall of the tire, and a third series of individual rear side wall bands arranged annularly about the rear side wall of the tire, and a fourth series of rear anchor bands coextensively aligned with a rear terminal end of each traction band, each rear anchor band including a rear anchor band forward end and a rear anchor band rear end, and a fifth series of forward anchor bands coextensively aligned with the forward terminal ends of each traction band, each forward anchor band including a forward anchor band and a forward anchor band rear end, and each end of each forward side wall band joined to a forward terminal end of each traction band, each end of each rear side wall band joined to a rear terminal end of each traction band, and each rear anchor band forward end integrally secured to a rear anchor ring, and each forward anchor band forward end adjustably arranged through a forward anchor ring, and wherein the rear anchor ring comprises a rigid annular ring of a fixed diameter less than the predetermined diameter of the wheel opening of each tire, and the forward anchor ring comprising a rigid annular ring of a diameter less than the wheel diameter of the tire, and wherein each end of each forward side wall band and each end of each rear side wall band is secured to each end of the respective traction band with a rectangular securement ring, and wherein the forward anchor ring includes an annular slot receiving each forward anchor band forward end of each forward anchor band therethrough, and wherein the forward anchor ring comprises an arcuate interior face to engage a lock member removably arranged through each forward anchor band forward end, and wherein each forward anchor band forward end includes a series of cylindrical sleeves orthogonally arranged through each forward terminal end of each forward anchor band, and wherein each forward anchor band forward end includes a rigid adjustment loop extending coextensively outwardly of each forward terminal end of each forward anchor band wherein each adjustment loop selectively receives a lever tool to extend the forward terminal of each forward anchor band through the associated slot, and wherein the lock member comprises a cylindrical lock pin, and the cylindrical lock pin is formed with an enlarged arcuate head of a predetermined configuration receivable within, and complementary to, an arcuate interior face of the forward anchor ring.

2. A vehicular traction apparatus as set forth in claim 1 wherein each traction band and each forward and rear anchor band is formed of a resilient memory retentent material.

* * * * *